US008370539B2

(12) United States Patent
Kabuto

(10) Patent No.: US 8,370,539 B2
(45) Date of Patent: Feb. 5, 2013

(54) VIDEO APPARATUS

(75) Inventor: Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 164 days.

(21) Appl. No.: 12/765,227

(22) Filed: Apr. 22, 2010

(65) Prior Publication Data

US 2010/0271548 A1 Oct. 28, 2010

(30) Foreign Application Priority Data

Apr. 23, 2009 (JP) ................................. 2009-104646

(51) Int. Cl.
*G06F 3/00* (2006.01)
*G06F 13/12* (2006.01)
*G06F 13/38* (2006.01)

(52) U.S. Cl. ................ 710/19; 710/15; 710/18; 710/38; 710/62; 710/64; 710/72; 710/73; 710/74

(58) Field of Classification Search .................... 710/15, 710/18, 19, 38, 62, 64, 72, 73, 74
See application file for complete search history.

(56) References Cited

U.S. PATENT DOCUMENTS

| | | | | |
|---|---|---|---|---|
| 2003/0185400 | A1 | 10/2003 | Yoshizawa et al. | |
| 2009/0033793 | A1 | 2/2009 | Kimura et al. | |
| 2009/0138935 | A1* | 5/2009 | Ohkita | 725/134 |
| 2009/0251606 | A1* | 10/2009 | Tokoro | 348/554 |
| 2010/0271548 | A1* | 10/2010 | Kabuto | 348/554 |

FOREIGN PATENT DOCUMENTS

| | | | | |
|---|---|---|---|---|
| CN | 101360196 | A | | 4/2009 |
| JP | 2004-007389 | A | | 1/2004 |
| JP | 2009-010537 | A | | 1/2009 |
| WO | WO 2009/001879 | A1 | * | 12/2008 |

OTHER PUBLICATIONS

China State Intellectual Property Office (SIPO) office action for SIPO patent application CN CN201010167330 (Oct. 9, 2011).

* cited by examiner

*Primary Examiner* — Tanh Nguyen
(74) *Attorney, Agent, or Firm* — Kilpatrick Townsend & Stockton LLP

(57) ABSTRACT

A video apparatus includes plural interface sections such as HDMI (Registered Trademark) sections for connection with plural video signal sources, a function transferring section which transfers functions of the interface sections, and one or more function blocks for use in common to the plural interface sections. The functions are assigned to the interface sections such as HDMI sections connected with the video signal sources, via switches for example, to minimize the number of the function blocks to be provided.

9 Claims, 7 Drawing Sheets

VIDEO APPARATUS

INCORPORATION BY REFERENCE

The present application claims priority from Japanese Patent Application JP2009-104646 filed on Apr. 23, 2009, the content of which is hereby incorporated by reference into this application.

BACKGROUND OF THE INVENTION

The present invention relates to video apparatuses provided with a plurality of interfaces such as an HDMI (High-Definition Multimedia Interface) (Registered Trademark).

The HDMI has now been widely circulated as an interface for simultaneously transmitting, directly or via an audio system, non-compressed video signal and audio signal from a video signal source such as a HDD (Hard Disc Drive) recorder or an STB (Set-Top Box) to a display apparatus such as a TV (television) receiver, a monitor or a projector.

Patent document JP-A-2009-10537 describes as a task "a bidirectional communication at a high speed with compatibility preserved" and describes as means for attaining the task that "when a bidirectional IP communication is performed between HDMI source 71 and HDMI sink 72 by making use of CEC line 84 and signal line 141, changeover control section 121 controls switch 133 in such a manner that, for data transmission, the switch 133 selects a partial signal constituting a differential signal from converter section 131, and for data transmission, the switch 133 selects a partial signal constituting a differential signal from receiver 82, while when a bidirectional communication is performed only by making use of CEC line 84, the changeover control section 121 controls the switch 133 in such a manner that the switch 133 selects a CEC signal from the HDMI source 71 or from the receiver 82." (See abstract).

SUMMARY OF THE INVENTION

The video apparatuses, which receives video/audio signals via an HDMI, have EDID (Extended Display Identification Data) representing a capability to deal with the signals supplied thereto via the HDMI, and this data information is read by a video signal source delivering a video/audio signal via the HDMI thereby to enable transmission of a video/audio signal in an optimum format to the video apparatuses. Further, cooperative performances between video apparatuses can be realized by the CEC (Consumer Electronics Control) for accomplishing the bidirectional communication between video apparatuses provided with the HDMI.

The above-mentioned patent document describes, as a new additional function of the HDMI, a high speed IP communication. In this manner, interfaces are intended to successively expand their functions to thereby enhance the user-friendliness.

In the meantime, as the number of types of video signal sources increases, the video apparatuses such as TV receivers and monitors tend to be provided with plural HDMI input sections along with various kinds of video input interfaces.

However, the video apparatuses such as TV receivers provided with a large number of interfaces including HDMI interfaces of enhances performance having increased functions suffer complicated interfaces and thus high costs.

In accordance with one embodiment of the present invention, a video apparatus includes a plurality of interface sections for transmitting and receiving a signal carrying video/audio information, a function block arranged to be connectable with the interface sections, the function block providing a predetermined function to one of the interface sections when connected with the one interface section, and function transferring sections for transferring functions of the plurality of interface sections, in which, when use of a function provided by the function block starts in one of the plurality of interface sections, one or more interface sections other than the one interface section are disconnected from the function block so that the function transferring sections transfer information as to whether or not the plurality of interface sections have the functions which the plurality of interface sections are to be provided by the function block.

According to the above-mentioned technical features, it is possible to provide a video apparatus having enhanced user-friendliness at low costs. Specifically, the video apparatus includes a minimized number of function blocks, providing interfaces simplified and inexpensive. Furthermore, necessary setting by a user is minimized and he or she no longer need to pay attention to which of plural interfaces such as HDMIs should be selected for connection with cables in order to accomplish connections between apparatuses, thus enhancing the user-friendliness.

Other objects, features and advantages of the invention will become apparent from the following description of the embodiments of the invention taken in conjunction with the accompanying drawings.

DESCRIPTION OF THE EMBODIMENTS

Embodiments of the present invention will now be described below.

Embodiment 1

Figure 1:
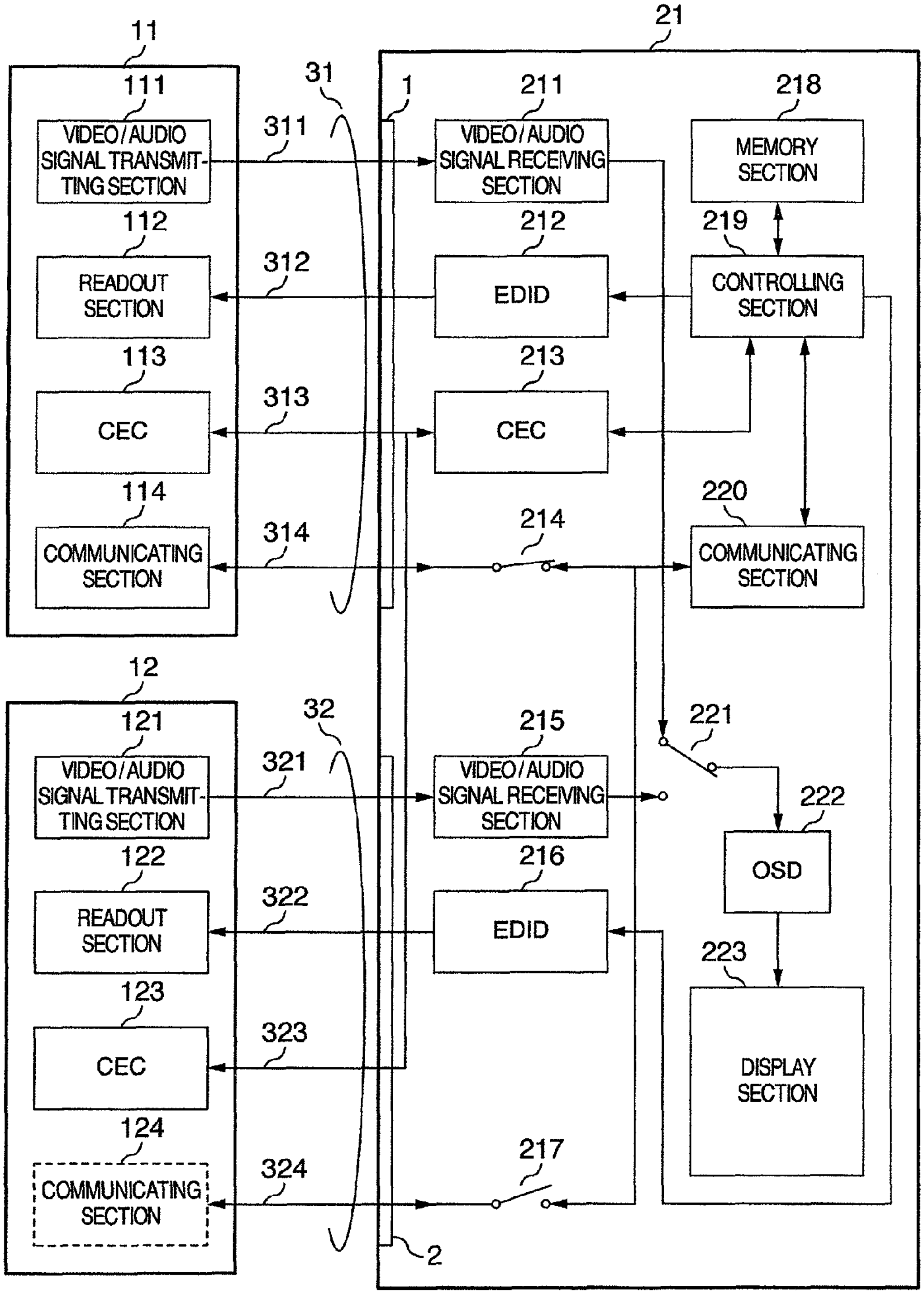
FIG. 1 is a diagram showing an example of a structure of a video apparatus and an example of a manner of connection of the video apparatus, according to an embodiment of the present invention.

In FIG. 1 showing Embodiment 1 of the present invention, video signal sources 11 and 12 are connected with a display apparatus 21 via HDMI cables 31 and 32. The video signal sources 11 and 12 have HDMI outputs, which include video/audio signal transmitting sections 111 and 121, readout sections 112 and 122, CEC communication sections 113 and 123, and communicating sections 114 and 124, respectively. Namely, each of the video signal sources 11 and 12 has one HDMI output. The video signal sources 11 and 12 may be such as a HDD recorder, a STB or the like.

It is noted that a combination of a video signal source and a display apparatus may be termed "a video apparatus". Further, the display apparatus 21 has a structure including a display section, but it need not be always include a display section. Instead of the display section, the display apparatus may include an output section for delivering an image signal to an external display unit.

The display apparatus 21 has HDMI input sections 1 and 2. The HDMI input sections 1 and 2 include video/audio signal receiving sections 211 and 215, EDID sections 212 and 216, and switches 214 and 217, respectively. A CEC communication section 213 is provided for use in common to the HDMI input sections 1 and 2.

The display apparatus 21 includes a communicating section 220 as a function block (hereafter, this may be also termed "a common interface function block") to be used in common to plural HDMI input sections and further includes switches 214 and 217 serving to make a changeover of the communicating section 220 between the HDMI input sections 1 and 2 so that the communicating section 220 provides a function to one of the HDMI input sections connected therewith. Numeral 218 represents a set parameter memory section, numeral 219 a controlling section, numeral 221 a video/audio signal changeover switch, numeral 222 an OSD (On-Screen Display) section, and numeral 223 a display section.

HDMI cables 31 and 32 include TMDS (Transition Minimized Differential Signaling) lines 311 and 321 for transferring video/audio data, DDC (Display Data Channel) lines 312 and 322 for transferring EDID data, CEC lines 313 and 323, and signal lines 314 and 324, respectively.

First, a high speed bidirectional communication is taken as an example for description of an embodiment. The display apparatus 21 includes plural HDMI input sections (1 and 2), but a single communicating section 220 is provided therefor. In the state shown in FIG. 1, since the switch 214 is turned on, the HDMI input section 1 connected with the HDMI cable 31 is available for the high speed bidirectional communication. Information such that the high speed bidirectional communication is possible is entered in the EDID section 212 which serves to transfer an HDMI receiving capability, and that information is sent to its associated video signal source 11. The EDID section may be also termed "a function transferring section" or "a capability transferring section", the CEC communication section may be also termed "a control signal transmitting/receiving section", and the OSD section may be also termed "an image synthesizing section".

Meanwhile, when the display apparatus 21 cannot afford to simultaneously communicate with its associated plural signal sources, the communicating section 220 turns off the switch 217, enters in the EDID section 216 information such that the high speed bidirectional communication is impossible, and sends that information to the associated video signal source 12. As a result, the video signal source 12 stops the function of its communicating section 124.

When the states of connection have been interchanged between the switches 214 and 217, namely, when the switch 214 is turned off and the switch 217 is turned on, information such that the high speed bidirectional communication is impossible is re-entered in the EDID section 212 while information such that the high speed bidirectional communication is possible is re-entered in the EDID section 216.

As described above, the communicating section 220 serving as a common interface function block is changed over between the HDMI sections 1 and 2 via the switches 214 and 217, and information such that the communicating section 220 is available or unavailable or the high speed bidirectional communication is possible or impossible is entered in the EDID sections 212 and 216. By this arrangement, it is possible to utilize the high speed bidirectional communication function by changing over it between the HDMI input sections 1 and 2. Consequently, it is no longer necessary to provide plural communicating sections in a display apparatus for realizing a high speed bidirectional communication, which is effective in simplifying and rationalizing the circuit structure.

Incidentally, the above-mentioned changeover may be accomplished by a user looking at a setting menu provided by the OSD section 222 of the display apparatus 21, or may be achieved in the order of arrival. Further, the number of the HDMI input sections and the number of the communicating sections in the display apparatus are not limited to those mentioned above. When the number of communicating sections in the display apparatus is lower than that of the HDMI input sections, use may be made of switches in the above-mentioned manner so that the high speed bidirectional communication function can be utilized by changing over the communication sections between the HDMI input sections via the switches to be turned on and off to effect the changeover. Thus, it is possible to make the number of the communication sections in the display apparatus smaller than that of the HDMI input sections, which is effective in simplifying and rationalizing the circuit structure.

Figure 5:
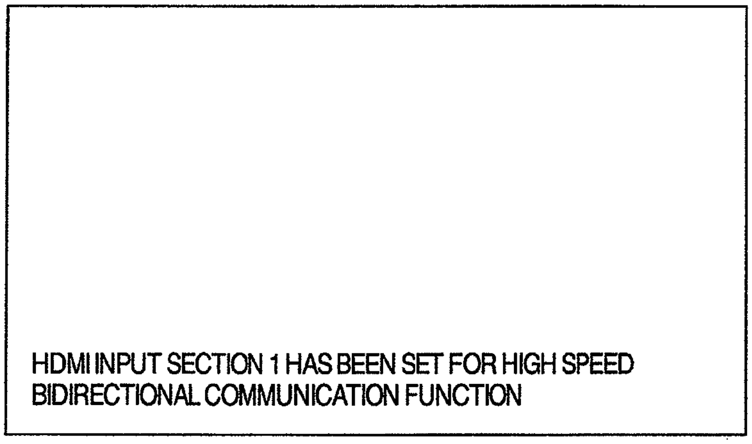
FIG. 5 is a diagram showing an example of a message display screen of a video apparatus according to an embodiment of the present invention.

When the high speed bidirectional communication function is assigned to the HDMI input section 1, the controlling section 219 controls the display apparatus 21 to notify the user. The control may be, for example, such that a display message may be synthesized in the OSD section 222 as shown in FIG. 5 for deliverance to the user. Alternately, an illuminating section such as of LEDs indicating an assignment of the high speed bidirectional communication function may be provided in the display apparatus 21 with its illumination operation controlled as desired.

Figure 6:
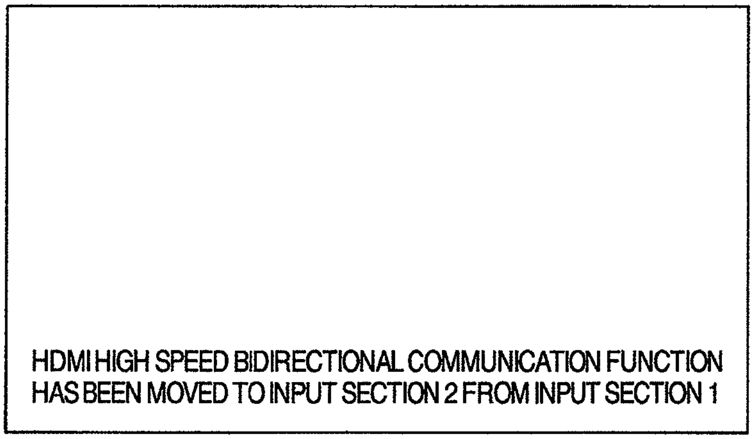
FIG. 6 is a diagram showing another example of a message display screen of a video apparatus according to an embodiment of the present invention.
Figure 7:
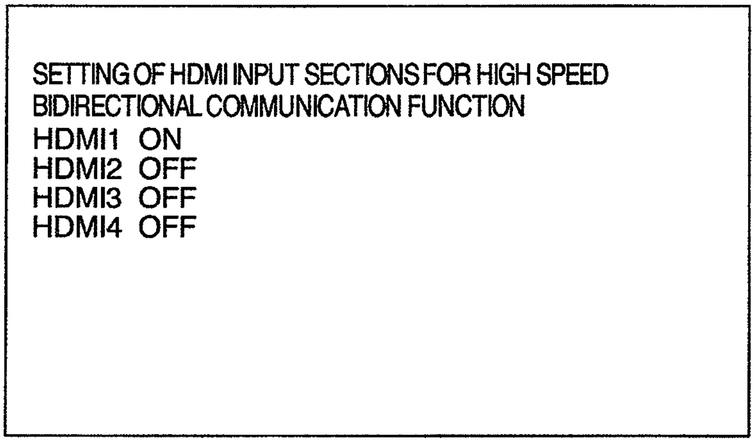
FIG. 7 is a diagram showing still another example of a message display screen of a video apparatus according to an embodiment of the present invention.

When an assignment change is made such that the high speed bidirectional communication function is assigned to the HDMI input section 2, the control may be, for example, such that a message to be displayed is synthesized in the OSD section 222 as shown in FIG. 6 for deliverance to the user. Further, the display message may be in the form of a list as shown in FIG. 7.

Next, a process of changeover of the communicating section 220 of the display device 21 between the HDMI input sections to be performed based on the order of arrival will be explained with reference to the flow chart shown in FIG. 2.

Figure 2:
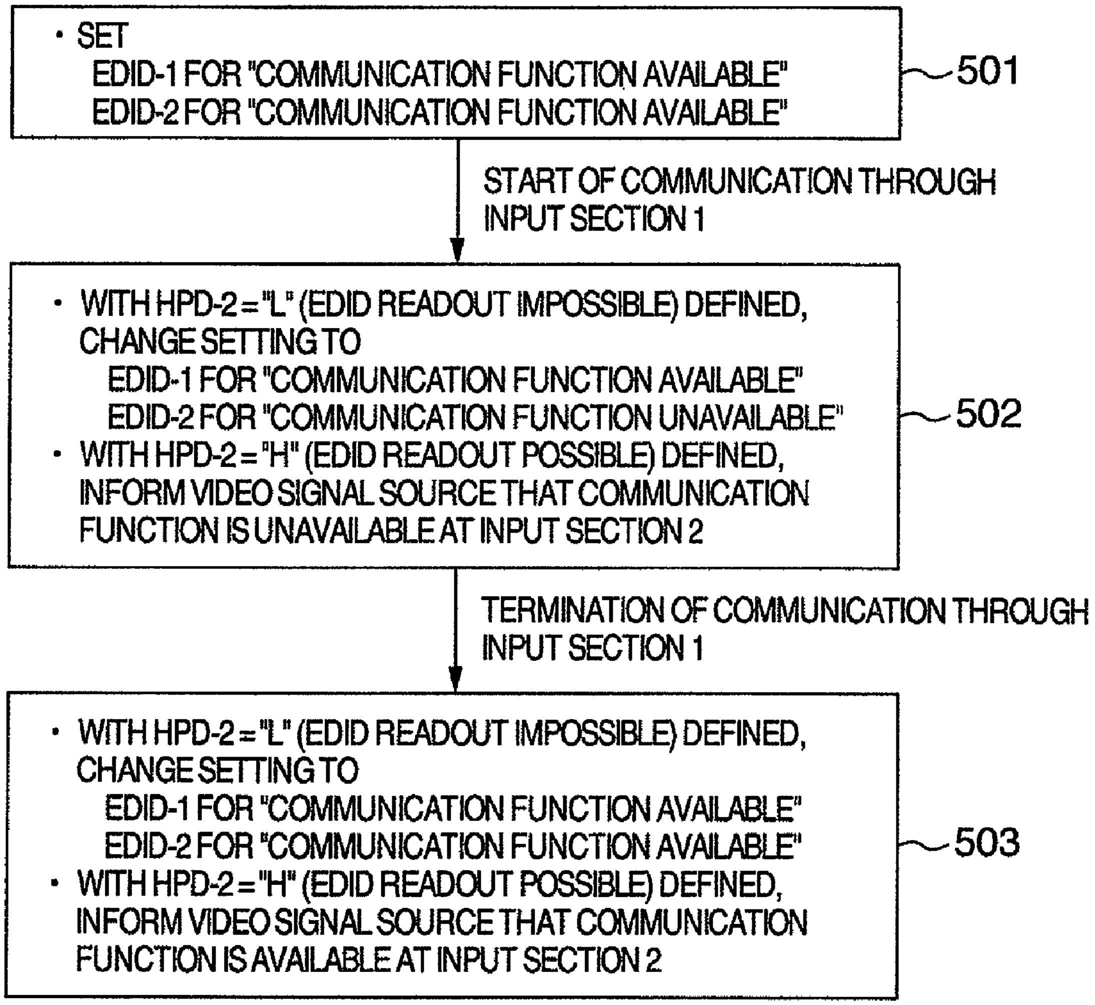
FIG. 2 is a flow chart showing an example of a process in a video apparatus according to an embodiment of the present invention.

In FIG. 2, EDID-1 represents an information content entered in the EDID section 212 shown in FIG. 1, while EDID-2 represents an information content entered in the EDID section 216 shown in FIG. 1. Although HPD-1 and HPD-2 are not shown in FIG. 1, they correspond to HPD (Hot Plug Detect) signals indicative of whether or not the EDID readout defined in the HDMI specifications is possible. HPD-1="H" indicates that the readout from HPD-1 is possible, while HPD-1="L" indicates that the readout from HPD-1 is impossible 501.

In the initial state 501, both HPD-1 and HPD-2 are "H" (indicating that the EDID readout is possible), and both EDID-1 and EDID-2 exhibit "COMMUNICATION FUNCTION AVAILABLE". Here, when a communication starts through the input section 1, the process moves to state 502.

After the state of the EDID-2 has been changed to "COMMUNICATION FUNCTION UNAVAILABLE" with HPD-2="L" (readout from EDID-2 impossible) established, HPD-2="H" (readout from EDID-2 possible) is resumed so that the associated video signal source 12 is informed that the input section 2 has not the communication function. Upon termination of the communication through the input section 1, the process goes to state 503.

After the state of the EDID-2 has been changed to "COMMUNICATION FUNCTION AVAILABLE" with HPD-2="L" (readout from EDID-2 impossible) established, HPD-2="H" (readout from EDID-2 possible) is resumed. As a result, the process is brought into a state identical with the initial state.

Embodiment 2

Figure 3:
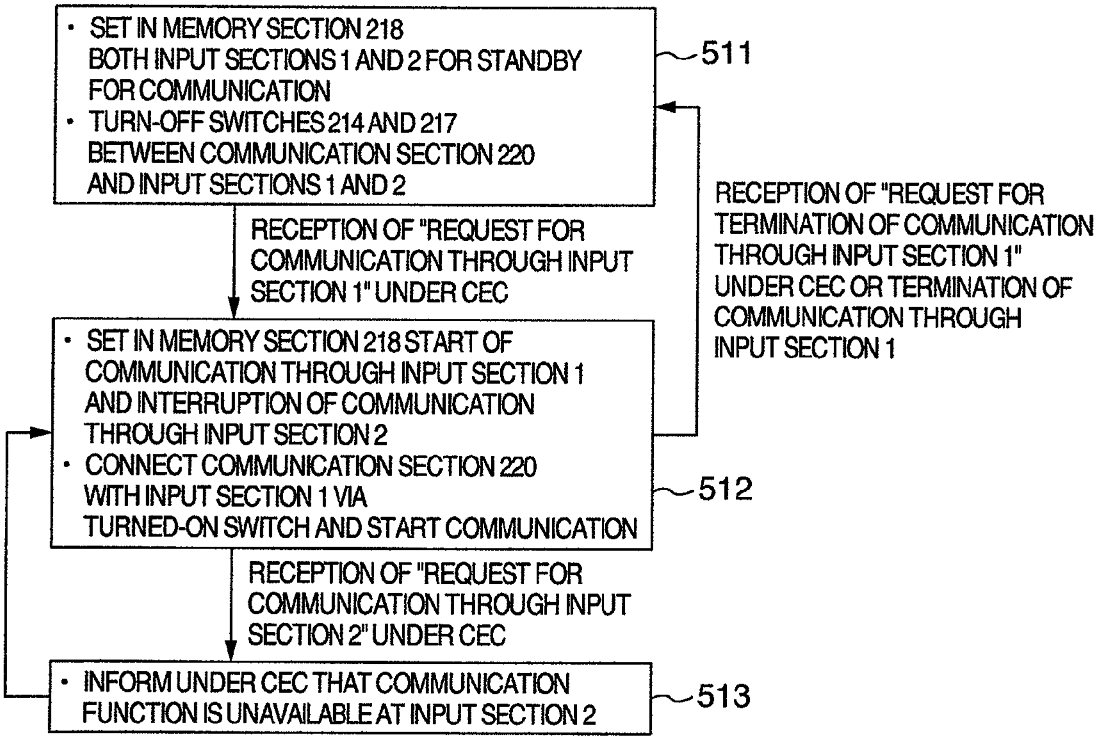
FIG. 3 is a flow chart showing another example of a process in a video apparatus according to an embodiment of the present invention.

Referring to the flow chart shown in FIG. 3, Embodiment 2 will be described in connection with transference of a signal receiving capability in which use is made of the CEC.

In the initial state 511, information such that both input sections 1 and 2 are in a standby state for the communication function is entered in the memory section 218 shown in FIG. 1, and the switches 214 and 217 are turned off.

When a communication request through the input section 1 is received under the CEC, the process moves to state 512. Information such that a communication through the input section 1 starts and a communication through the input section 2 stops is entered in the memory section 218, and the switch 214 is turned on to start the communication.

When a communication request through the input section 2 is received over the CEC, the process moves to state 513, in which a response is given over the CEC such that the communication function is unavailable at the input section 2, and then the process moves back to the state 512.

Further, in the state 512, when it occurs that a command is issued over the CEC such that the communication through the input section 1 should be stopped or the communication through the input section 1 has stopped, the process returns to the initial state 511.

It is known by referring to the content set in the memory section 218 in which state the process is being executed. By this, it is possible, without resorting to user's manipulations, to automatically change setting of the functions of the common interface function block.

Embodiment 3

Next, Embodiment 3 will be described in which it is assumed that the video signal source 11 is a combined unit having a video signal source and an audio amplifier, and in which transmission of an audio signal is taken as an example.

When the video apparatus 21 selects the video signal source 12 to receive therefrom a video/audio signal through the TDSM line 321, the video apparatus 21 is capable of displaying the video signal received from the video signal source 12. However, without an arrangement for transmitting an audio signal from the video signal source 12 to the video signal source 11 serving as an audio amplifier, a high performance reproduction of the audio signal in the audio amplifier will be impossible. This is due to the fact that the TMDS line 311 can only transmit a video/audio signal from the video signal source 11 serving as an audio amplifier to the display apparatus 21 and signal transmission in the opposite direction is impossible therewith. As a novel arrangement for an audio signal transmission from the display apparatus 21 to the video signal source 11 serving as an audio amplifier, it is considered to make use of the communicating sections 114 and 220.

Figure 4:
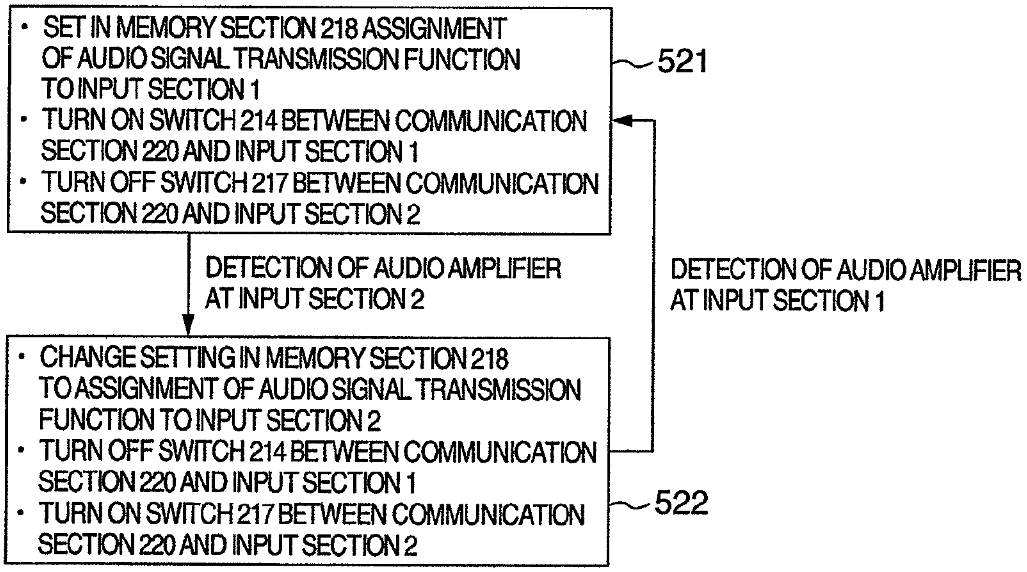
FIG. 4 is a flow chart showing still another example of a process in a video apparatus according to an embodiment of the present invention.

In this connection, owing to the features of the CEC, it can be readily known from the CEC logical addresses representative of the kinds of the video signal sources which of the video signal sources 11 and 12 serves as an audio amplifier. The process therefor will be described with reference to the flow chart shown in FIG. 4.

In the initial state 521, information such that an audio signal transmission function is assigned to the HDMI input section 1 is stored in the memory section 218, the switch 214 between the communicating section 220 and the HDMI input section 1 is turned on, and the switch 217 between communicating section 220 and the other HDMI input section 2 is turned off.

When the signal source unit detected under the features of the CEC at the HDMI input section 1 is an audio amplifier, the initial state 521 is preserved.

Here, when an audio amplifier is detected at the HDMI input section 2, the process moves to state 522, in which information such that the assignment of the audio signal transmission function to the HDMI input section 1 is changed to that to the HDMI input section 2 is stored in the memory section 218, the switch 214 between the communicating section 220 and the HDMI input section 1 is turned off, and the switch 217 between communicating section 220 and the other HDMI input section 2 is turned on, thereby assigning the audio signal transmission function to the HDMI input section 2.

In this manner, by allotting the communicating section 220, which realizes the audio signal transmission, to the HDMI input section 2 at which a video signal source having a logical address representative of an audio amplifier, it is possible to realize automatic changeover between the input sections without resorting to the user's manipulations.

In the above example, use is made of the detection of a logical address of an audio amplifier. However, the automatic changeover may be carried out when an audio signal is required from an audio amplifier. In this case, when plural audio amplifiers, e.g., audio amplifiers connected with rear loud speakers and those connected with front loud speakers are connected, and if it is permitted to supply same audio signals to plural audio amplifiers, the switches 214 and 217 may be used in such a manner that they assumes a turned-on state simultaneously. The display apparatus will be able to determine whether or not same audio signals are permitted, by confirming the signal receiving capability of the plural amplifiers under the CEC.

Embodiment 4

Figure 8:
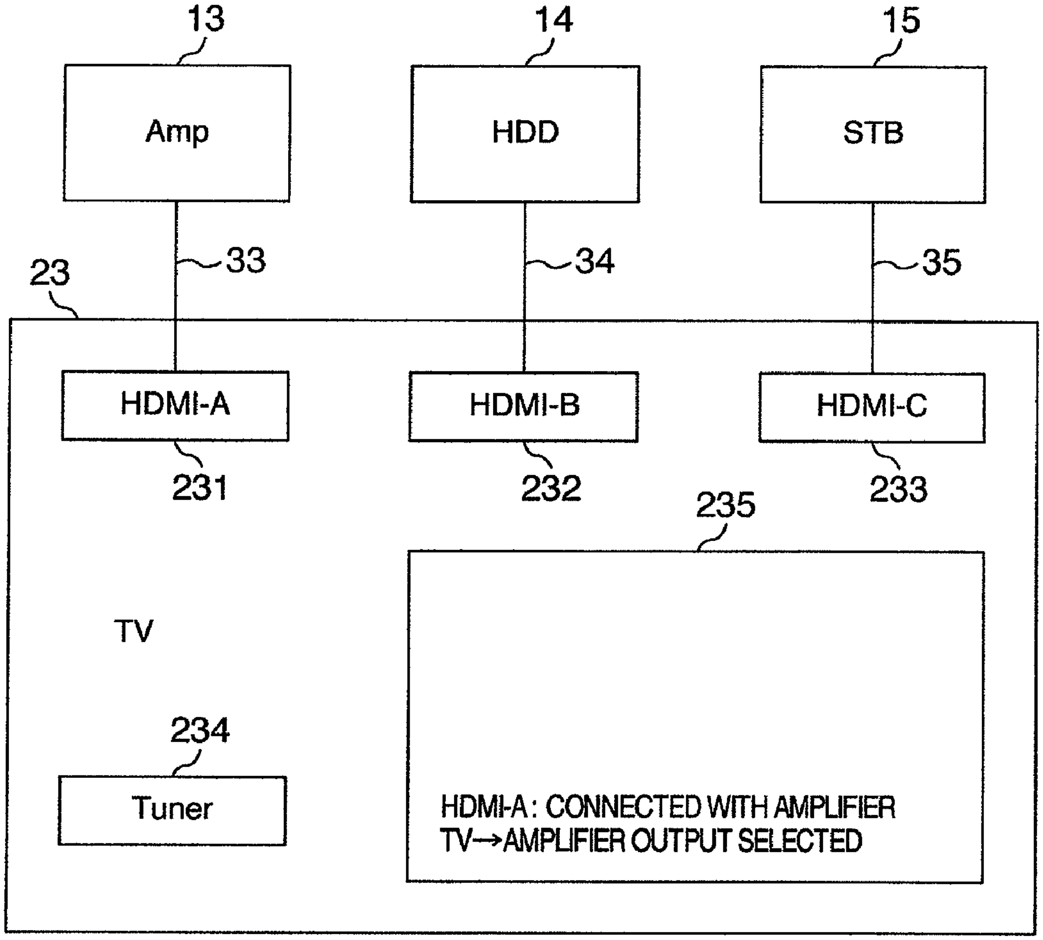
FIG. 8 is a diagram showing an example of a manner of connection of a video apparatus along with an example of a message display screen according to an embodiment of the present invention.

Embodiment 4 will be described with reference to FIGS. 8 and 9 in which examples of manners of connection of a video apparatus are illustrated. Numeral 23 represents a TV receiver including HDMI input sections 231 to 233, a tuner 234 for receiving broadcast signals, and a display section 235.

Numeral 13 represents an audio amplifier, 14 an HDD recorder, 15 an STB, and 33 to 35 HDMI cables.

The TV receiver 23 has a function to deliver, through HDMI input sections, an audio signal to video apparatuses connected therewith, namely, the TV receiver 23, which may be, for example, the display apparatus 21 described in Embodiment 3, serves to sequentially assign a function to an HDMI input section requiring the function. A control is performed in such a manner that, when the TV receiver 23 detects that the audio amplifier 13 is connected with the HDMI-A input section 231, the TV receiver 23 assigns an audio signal delivering function to the HDMI-A input section 231 and that the assignment result is displayed on the display section 235 for information to the user.

Figure 9:
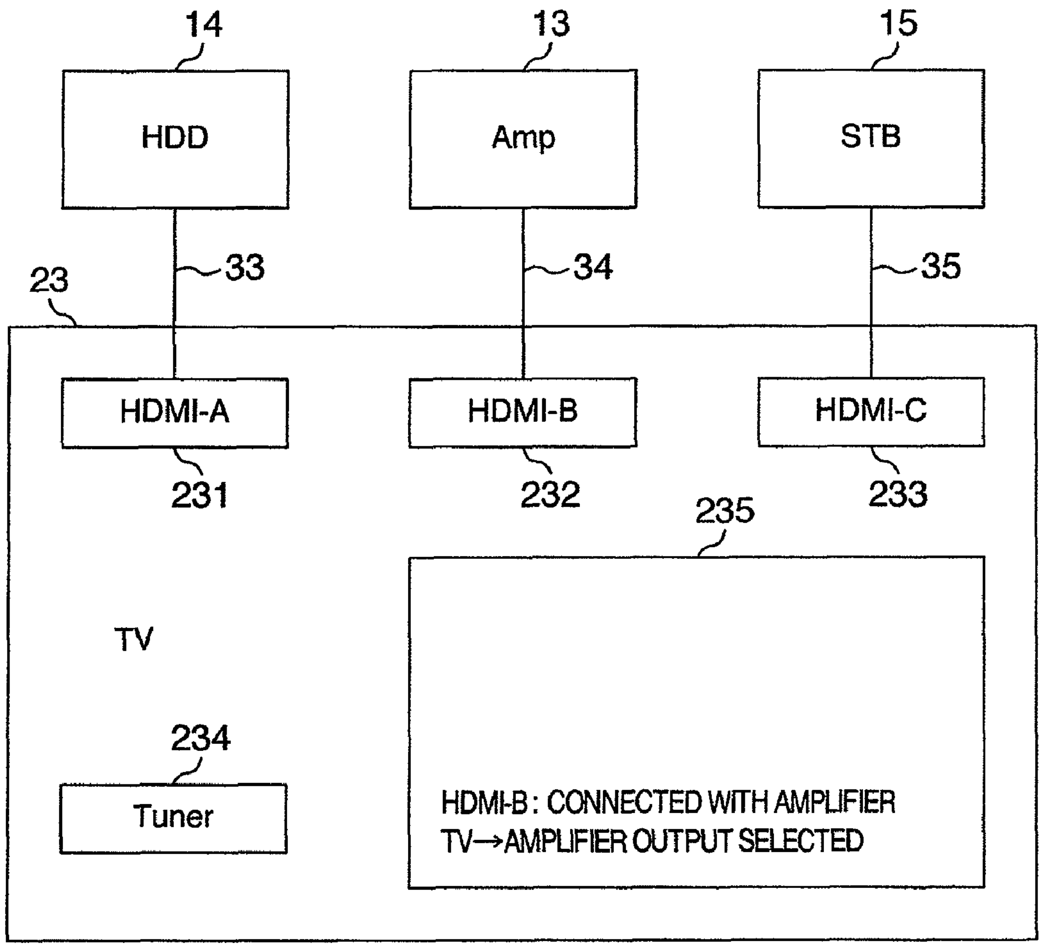
FIG. 9 is a diagram showing another example of a manner of connection of a video apparatus along with another example of a message display screen according to an embodiment of the present invention.

Meanwhile, when the connections of HDMI cables 33 and 34 with the audio amplifier 13 and the HDD recorder 14 are interchanged as shown in FIG. 9, a control may be performed in such a manner that the TV receiver 23 detects the interchanged connections and accomplishes an adjustment to the effect that the audio signal delivering function is newly assigned to the HDMI-B input section 232 and that the result of the assignment so adjusted is displayed on the display section 235 for information to the user.

The detection of the interchange of the connections between the HDMI cables 33 and 34 may be achieved, for example, by: recognizing that a DDC+5V power for a EDID readout circuit to be supplied from a video signal source to the display apparatus is ceased at the time the cable connection interchange; and inquiring a signal source apparatus, to be newly associated with the display apparatus, of the kind of the signal source unit connected with the input section to which the power supply has stopped.

Embodiment 5

Figure 10:
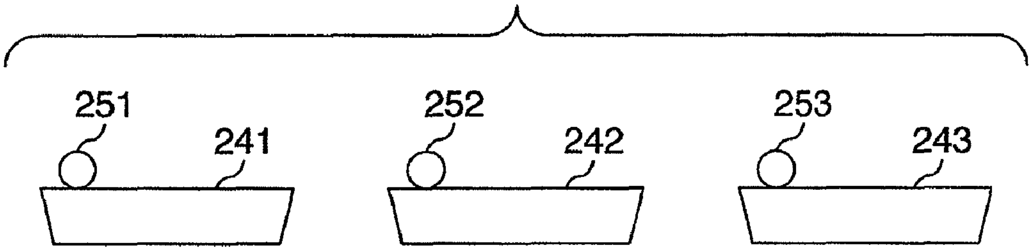
FIG. 10 is a diagram showing an arrangement of LEDs in a video apparatus according to an embodiment of the present invention.

Embodiment 5 will now be described with reference to FIG. 10 showing an arrangement of HDMI input sections of a video apparatus. In the above-described embodiments, plural HDMI input sections share function blocks the number of which is smaller than that of the HDMI input sections and an OSD display is given, on an image display screen, indicating to which HDMI input section a common interface function block is allotted.

On the contrary, in this embodiment, as shown in FIG. 10, LEDs 251-253 are provided in the vicinity of HDMI input connectors 241-243 and are activated to indicate to which connector a function is assigned from a common interface function block, thereby achieving the indication of the function assignment.

Further, the mode of activation of the LEDs may be on-state/off-state or changes of colors of emission light to indicate assignment/non-assignment of a function or may be the blinking rate or the luminosity to indicate the communication speed at the time of function assignment to inform the user of the operation states of the LEDs for his or her confirmation.

This indication by the use of the LEDs so activated has the merit of giving the user a confidence. Further, for the indication, the LEDs may be replaced by other display devices such as LCDs, electroluminescent devices, electronic papers, etc. In case the HDMI input connectors are mounted on the rear panel of the apparatus, it is possible that the user may not be able to see the states of the display devices in a normal state of use of the apparatus. To cope with this, LEDs may be provided on the front panel of the apparatus or an LCD display is provided on the front side of the apparatus for thereby indicating the assignment by the common interface function block.

Embodiment 6

Figure 11:
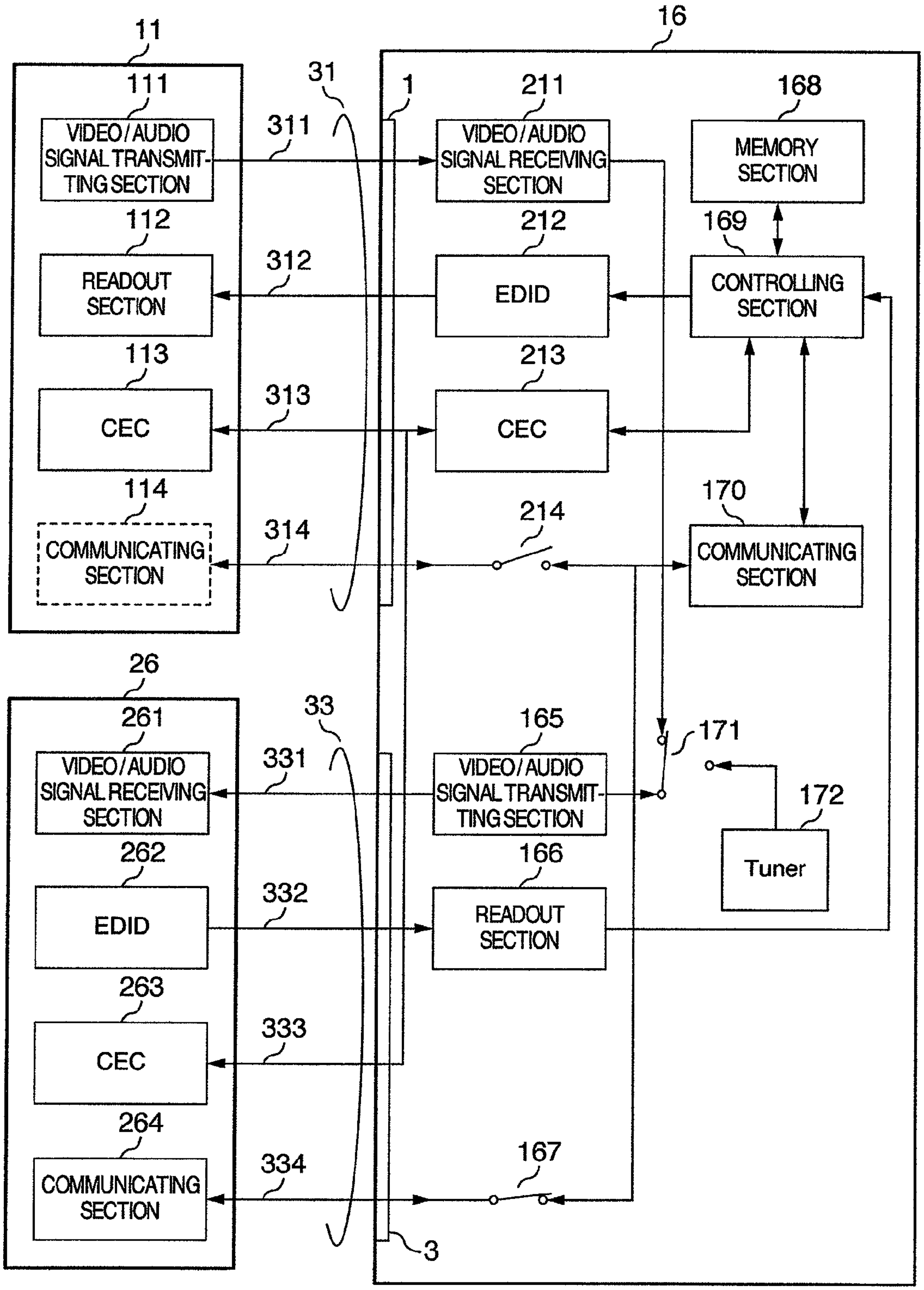
FIG. 11 is a diagram showing an example of a structure of a video apparatus and an example of a manner of connection of the video apparatus, according to an embodiment of the present invention.

FIG. 11 shows Embodiment 6, in which, contrary to Embodiment 1 shown in FIG. 1 in which the display apparatus 21 has HDMI input sections 1 and 2, an STB 16 has an HDMI input section 1 and an HDMI output section 3. Members having similar functions to those in FIG. 1 are denoted by the same numerals and explanation thereof will be omitted.

A video signal source 11 and an image receiving apparatus 26 such as a TV receiver are connected with the STB 16 through HDMI cables 31 and 33. The image receiving apparatus 26 includes a video/audio signal receiving section 261, an EDID section 262, a CEC communication section 263, a communicating section 264 and has a function to receive a video/audio signal output through the HDMI cable 33. The HDMI cable 33 includes a TDMS line 331, a DDC line 332, a CEC line 333 and a signal line 334.

The STB 16 includes a video/audio signal receiving section 211, an EDID section 212, a CEC communication section 213, switches 214 and 167, a video/audio signal transmitting section 165, a readout section 166, a memory section 168, a controlling section 169, a communicating section 170, a changeover switch 171, and a tuner 172. The STB 16 has a function to perform a changeover between the video/audio signal output of the video signal source 11 received via the HDMI input section 1 and the video/audio signal output of the built-in tuner 172 by effecting a changeover operation of the switch 171 thereby to transmit one of the video/audio signal outputs to the image signal receiver 26 via the HDMI output section 3.

Description will be made of a case taken as an example in which the communicating block 170 as the common interface function block provides a bidirectional high speed communication.

When the STB 16 requests a high speed bidirectional communication with the image receiving apparatus 26, the switch 167 should be turned on with the switch 214 being turned off to start a communication between the communicating section 170 of the STB 16 and the communicating section 264 of the apparatus 26. If some initial setting is necessary before the communication, initial setting information may be exchanged in advance between the CEC communication section 213 of the STB 16 and the CEC communication section 263 of the apparatus 26 via the CEC line 333.

On the other hand, when the image receiving apparatus 26 requests a high speed bidirectional communication with the STB 16, the CEC communicating section 263 of the apparatus 26 may issue a request message to the CEC communicating section 213 of the STB 16 via the CEC line 333, or alternately, the communicating section 264 of the apparatus 26 may deliver a request signal to the signal line 334.

In case a communication request signal is delivered to the signal line 334, it will be necessary to provide the STB with a circuit (not shown in the drawing) capable of receiving the communication request signal. However, since such a circuit will be smaller in scale than the circuit for realizing the high speed bidirectional communication, the effect of rationalization accomplished by the provision of the common interface function block is large enough to compensate for the additional requisite.

When the communicating section 170 of the STB 16 is allotted to the communication with the image receiving apparatus 26, the controlling section 169 enters information on the allotting in the memory section 168. During this state, when a communication request is issued from the image signal source 11 via the CEC line 313 or another signal line of the HDMI cable 31, the STB 16 makes a response thereto to refuse the request. Even in a state in which the communicating section 170 has been allotted to the communication with the image receiving apparatus 26, if the communication is ceased or does not actually take place, whether an apparatus to which the communicating section 170 be allotted should be changed or not may be decided by the controlling section 169 in the STB 16 after the image receiving section 26 has been informed or inquired thereof and permission has been given by the section 26.

In the above description, a case is taken as an example in which one common interface function block is provided, but a smaller number of plural common interface function blocks than that of interface sections may be provided, or plural kinds of common interface function blocks may be provided. In addition, switches 214, 217 and 167 to be turned on and off may be replaced by other devices for on-off controlling the signal transmission.

As has been described, a common interface function block is allotted to plural interface sections such as HDMI input sections so that it is no longer necessary to provide a common interface function block for each of the plural interface sections which are not connected for cooperation with their respective interface function blocks simultaneously. Consequently, it is possible to advantageously provide video apparatuses of a simplified structure at low costs. Further, the features of automatic allotting of one or more common interface function blocks advantageously provides an operational environment which is free of user's manipulations and suffers almost no false operations.

In the above-described embodiments, a communicating section for realizing a high speed bidirectional communication is taken as an example of the common interface function block, but it is apparent that the function block may be for realizing any other functions.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A video apparatus comprising:

a plurality of interface sections which receive signals carrying video/audio information from a plurality of connected devices, each interface section receiving a corresponding signal carrying video/audio information from a corresponding connected device; and a function block arranged to be connectable with the interface sections, the function block performing a predetermined function between the video apparatus and one of the connected devices, wherein, when the function block starts to perform the predetermined function between the video apparatus and the one of the connected devices, the one or more interface sections not connected to the one of the connected devices are disconnected from the function block, and the video apparatus informs the connected devices other than the one of the connected devices that the function block cannot perform the predetermined function between the video apparatus and the connected devices other than the one of the connected devices in response to a request for performing the predetermined function from the connected devices other than the one of the connected devices.

2. A video apparatus comprising:

a first interface section which receives a first signal carrying video/audio information from a connected first device;

a second interface section which receives a second signal carrying video/audio information from a connected second device; and a function block arranged to be connectable with the first interface section and the second interface section, the function block performing a predetermined function between the video apparatus and one of the connected first and second devices, wherein, when the function block starts to perform the predetermined function between the video apparatus and the connected first device, the second interface section is disconnected from the function block, and the video apparatus informs the connected second device that the function block cannot perform the predetermined function between the video apparatus and the connected second device in response to a request for performing the predetermined function from the connected second device, and wherein, when the function block starts to perform the predetermined function between the video apparatus and the connected second device, the first interface section is disconnected from the function block, and the video apparatus informs the connected first device that the function block cannot perform the predetermined function between the video apparatus and the connected first device in response to a request for performing the predetermined function from the connected first device.

3. The video apparatus according to claim 1, wherein the interface sections are HDMI sections and the video apparatus informs the connected devices other than the one of the connected devices that the function block cannot perform the predetermined function between the video apparatus and the connected devices other than the one of the connected devices via CEC lines.

4. The video apparatus according to claim 1, further comprising an on screen display section which synthesizes a display message to notify which interface sections can provide the predetermined function.

5. The video apparatus according to claim 1, further comprising a display device which is provided in the vicinity of the plurality of interface sections and displays which interface sections can provide the predetermined function.

6. The video apparatus according to claim 1, wherein the predetermined function is a bidirectional communication function.

7. The video apparatus according to claim 2, wherein the predetermined function is a bidirectional communication function.

8. The video apparatus according to claim 1, wherein the predetermined function is an audio signal transmission function.

9. The video apparatus according to claim 2, wherein the predetermined function is audio signal transmission function.

* * * * *